United States Patent [19]

Ohsaki

[11] Patent Number: 4,592,040
[45] Date of Patent: May 27, 1986

[54] DISC-RECORD PLAYER WITH A PRESSURE LEVER CARRYING A PRESSURE MEMBER

[75] Inventor: Kiyoshi Ohsaki, Tokyo, Japan

[73] Assignee: U.S. Philips Corporation, New York, N.Y.

[21] Appl. No.: 637,083

[22] Filed: Aug. 2, 1984

[30] Foreign Application Priority Data

Aug. 24, 1983 [JP] Japan .......................... 58-129827[U]

[51] Int. Cl.$^4$ .......................... G11B 1/00; G11B 17/04; G11B 25/04
[52] U.S. Cl. .................................. 369/77.1; 369/270
[58] Field of Search ............... 369/77.1, 75.2, 258, 369/263, 270

[56] References Cited

U.S. PATENT DOCUMENTS

| | | | |
|---|---|---|---|
| 3,436,082 | 4/1969 | Bostrom et al. | 369/270 |
| 4,498,165 | 2/1985 | Wilkinson | 369/270 |
| 4,499,573 | 2/1985 | Motinaga | 369/75.2 |
| 4,507,768 | 3/1985 | Ikedo et al. | 369/263 |

FOREIGN PATENT DOCUMENTS

| | | | |
|---|---|---|---|
| 68267 | 4/1983 | Japan | 369/258 |
| 57664 | 4/1983 | Japan | 369/258 |
| 40345 | 3/1984 | Japan | 369/258 |

*Primary Examiner*—Steven L. Stephan
*Attorney, Agent, or Firm*—David R. Treacy

[57] ABSTRACT

In a disc-record player comprising a turntable which is mounted for rotation in a frame there is provided a pressure lever which is pivotally connected to the frame by a spindle. The pressure lever comprises an arm portion and a pressure portion, the arm portion being connected to the frame by said spindle and the pressure portion being connected to the arm portion by another spindle which extends parallel to the first-mentioned spindle. The pressure portion carries a pressure member which can be moved towards the turntable from an inoperative position into a press-on position by pivoting the arm portion. In the press-on position the pressure portion exerts pressure on the pressure member via a ball, the ball and the pressure member being at least substantially coaxial with the turntable in the press-on position. By pivoting the pressure portion relative to the arm portion the pressure member extends substantially parallel to the upper surface of the turntable both in the inoperative position and in the press-on position.

8 Claims, 7 Drawing Figures

DISC-RECORD PLAYER WITH A PRESSURE LEVER CARRYING A PRESSURE MEMBER

The invention relates to a disc-record player comprising a frame, a turntable which is mounted for rotation in the frame, and a pressure lever which is pivotally connected to the frame and which carries a pressure member which can be pivoted by the pressure lever from an inoperative position towards the turntable into an operating position. A ball is arranged between the pressure lever and the pressure member, the pressure lever exerting pressure on the pressure member via the ball in the operating position. In this position the ball and the pressure member are substantially coaxial with the turntable and the pressure member urges the disc against the upper or playing side of the turntable.

Such a disc-record player is disclosed in German Patent Specification No. 11 55 614. In this known disc-record player the pressure member acts against a ball which lies against the upper wall of the pressure member. The use of this ball, on which the pressure lever acts, enables the weight and dimensions of the pressure member of the known disc-record player to be reduced. However, measured in the axial direction relative to the turntable, the height of the assembly comprising the pressure member, the ball and the pressure lever is still considerable. Moreover, as in the known disc-record player the pressure lever is pivotable bodily about the pivotal axis, in the inoperative position the pressure member will occupy an oblique position relative to the upper side of the turntable. This oblique position requires a substantial amount of space about the turntable. Due to the height of the assembly comprising the pressure member, the ball and the pressure lever, the pressure member, when in this oblique position, is liable to complicate the operation of loading the disc record onto the turntable.

SUMMARY OF THE INVENTION

The object of the invention is to provide a disc-record player in which the pressure member does not interfere with loading and unloading of the disc record.

According to the invention the pressure lever is articulated, and comprises an arm portion and a pressure portion. The arm portion is pivotally connected to the frame by a first pivot or spindle, the pressure portion is connected to the arm portion by a second pivot or spindle which extends parallel to the first pivot. The pressure portion carries the pressure member, the pivotal arrangement of the pressure portion relative to the arm portion ensuring that the pressure member extends substantially parallel to the upper or playing side of the turntable both in the inoperative position and in the operating position.

By the use of such an articulated pressure lever, the pressure member and the pressure portion supporting it are pivoted relative to the arm portion when the pressure lever is pivoted away from the turntable to the inoperative position, so that in this position the pressure portion and the pressure member will be substantially parallel to the upper side of the turntable. This leaves a space between the underside of the pressure member and the upper side of the turntable through which a disc can be readily loaded and unloaded.

This arrangement of the pressure member enables the height of the housing of the disc-record player to be minimized. In the operating position the pressure member again occupies a parallel position to the upper side of the turntable, so that the disc is retained effectively under the influence of the pressure exerted on the pressure member by the ball. Further, the coaxial arrangement of the ball with the turntable, in the operating position, enables the pressure member to rotate with the turntable unimpeded by the pressure portion. As the pressure portion also is disposed substantially parallel relative to the upper side of the turntable, the forces exerted on the turntable by the ball are directed favorably. Further, the reaction forces exerted on the pressure portion by the ball are also directed favorably. The disc-record player in accordance with the invention is very suitable for use as a compact-disc player intended for playing optically readable audio discs. Such a player has compact external dimensions and requires an accurate pressing-down of the disc onto the turntable playing side.

A preferred embodiment of the invention is characterized in that an actuating lever is also pivotable about the axis of the pivotal connection between the arm portion and the frame. A first spring is arranged between the frame and the actuating lever, to urge the actuating lever in an upward or generally axial direction away from the turntable, and a second spring is arranged between the actuating lever and the arm portion, to urge the arm portion and the actuating lever into abutment with each other so that they are pivoted together when the pressure member is moved from the inoperative position of the operating position. The actuating lever is pivotable further against the force of the second spring when the pressure member has assumed the operating position, so that the actuating lever becomes disengaged from the arm portion. The pressure of the actuating lever which can be pivoted slightly further when the pressure member has reached the operating position enables the pressure lever to be actuated in a reliable and easy way. The spring coupling between the actuating lever and the arm portion of the pressure lever precludes damage to the pressure lever during actuation. Further, tolerances of the parts can be compensated effectively.

In a preferred embodiment of the invention the actuating lever comprises an actuating portion and a stop portion, the actuating portion being cooperable with a drive member for controlling the pivotal movement of the actuating lever, and the stop portion abutting the arm portion during the common pivotal movement of the actuating lever and the arm portion of the pressure lever. Thus, the actuating lever is divided into portions corresponding to the functions to be performed by this lever. The actuating portion performs the control function of the actuating lever; and the step portion in combination with the second spring serves to pivot the arm portion synchronously with the actuating lever during the movement of the pressure member towards the disc on the turntable. This construction also ensures that during the return movement of the pressure member to the inoperative position the pressure lever accurately follows the movement of the actuating lever.

The drive member may form part of a loading device by means of which the disc is transferred from outside the disc-record player towards the turntable, the actuating portion of the pressure lever being positioned in the path of movement of the drive member under the influence of the first spring during the inward movement of the loading device, and being actuated and subsequently pivoted by the drive member during the final stage of the inward movement. The drive member on the loading device cooperates with the actuating portion during insertion of a disc so as to pivot the activating lever and with it the pressure lever. Thus, the pressure lever is pivoted synchronously during the movement of the loading device, ensuring that the pressure member reaches the operating position after the disc has been transferred to the turntable by the loading device. The coupling action of the actuating lever is then advantageous because this effectively compensates for tolerances in the position of the control member relative to the actuating portion.

In another preferred embodiment the actuating portion and the stop portion of the actuating lever are disposed on opposite sides of the pivotal axis of this lever, the actuating portion being downwardly inclined and the stop portion extending upwardly relative to the remainder of the actuating lever in the operating position of the pressure member. As a result of this arrangement of the actuating portion and the stop portion the actuating lever is readily capable of covering the distance in the height direction between the loading device and the pressure lever. Thus, in the inoperative position the pressure lever may be situated at some distance from the loading device, so that the loading device can be moved inwards without being obstructed by the pressure lever.

In a further preferred embodiment of the invention, in the inoperative position the pressure portion of the pressure lever with a frame portion and lies substantially parallel to the upper side of the turntable under the influence of a third spring arranged between the pressure portion and the arm portion. Instead of using a spring it is possible to provide an additional stop on the arm portion, in addition to the stop formed by the frame portion, in order to ensure the correct position of the pressure member and the pressure portion.

In another embodiment of the invention the ball may be held by an annular part on the underside of the pressure portion of the pressure lever against displacement in directions transverse to the axis of the turntable. The annular element is coaxial with the turntable at least in the operating position of the pressure member. This has the advantage that the pressure exerted on the pressure member by the ball always acts directly along the axis of rotation of the turntable, thereby preventing undesired lateral forces from acting on the turntable shaft, the bearing means and the motor underneath the turntable. This is advantageous for the life of the disc-record player.

Two embodiments of the invention will be described in more detail, by way of example, with reference to the accompanying drawings.

DESCRIPTION OF THE PREFERRED EMBODIMENTS

Figure 1:
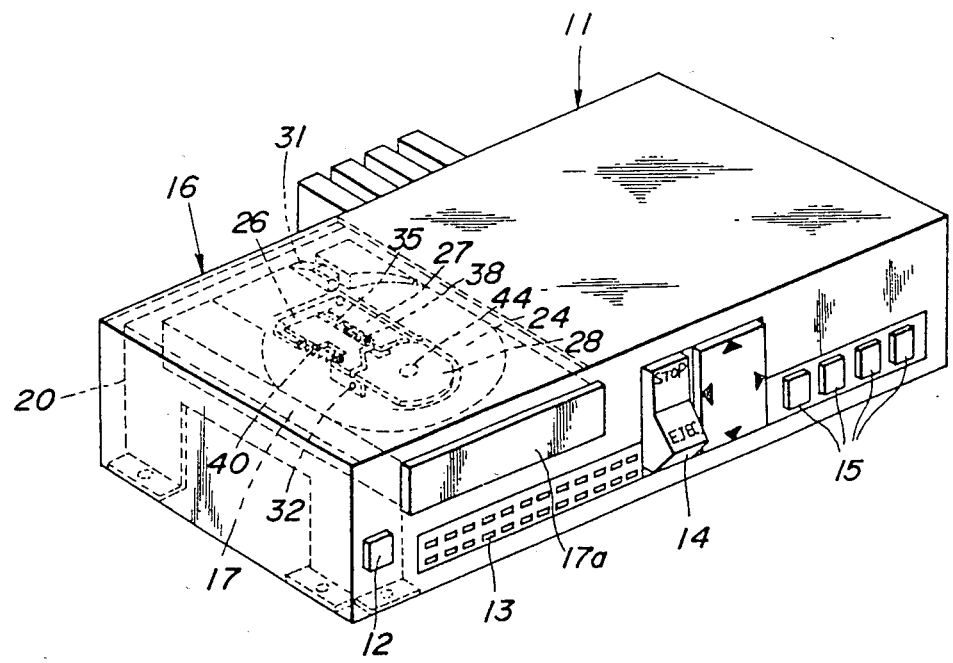
FIG. 1 is a perspective view of a disc-record player in accordance with the invention.

The disc-record player shown in FIG. 1 is of a type intended for playing optically readable audio discs for example those referred to as "Compact Discs". The player comprises a housing 11 with a front side on which an on/off switch 12, a disc-selection indicator field 13, an eject button 14 and a group of switches 15 are situated. The housing 11 accommodates a mechanical section 16 of the player on the left-hand side, as viewed in FIG. 1. This mechanical section constitutes a unit.

Figure 2:
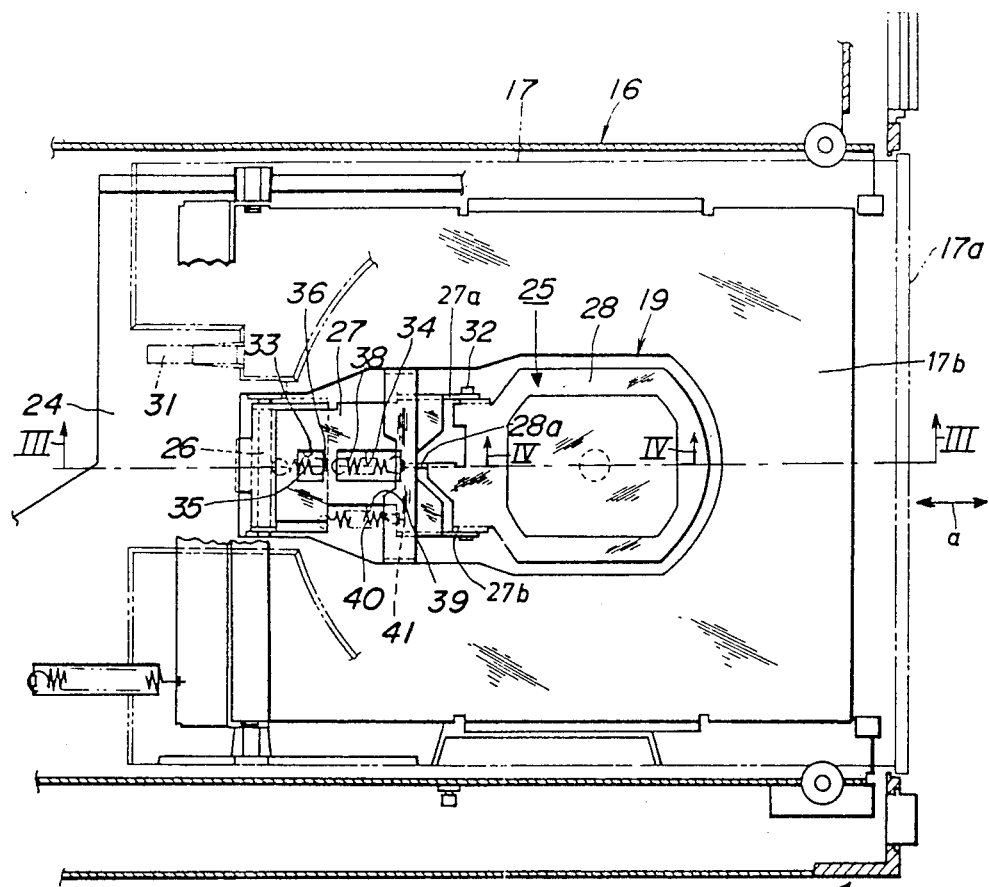
FIG. 2 is an enlarged-scale a plan view at a large scale of a part of the disc-record player shown in FIG. 1.
Figure 3:
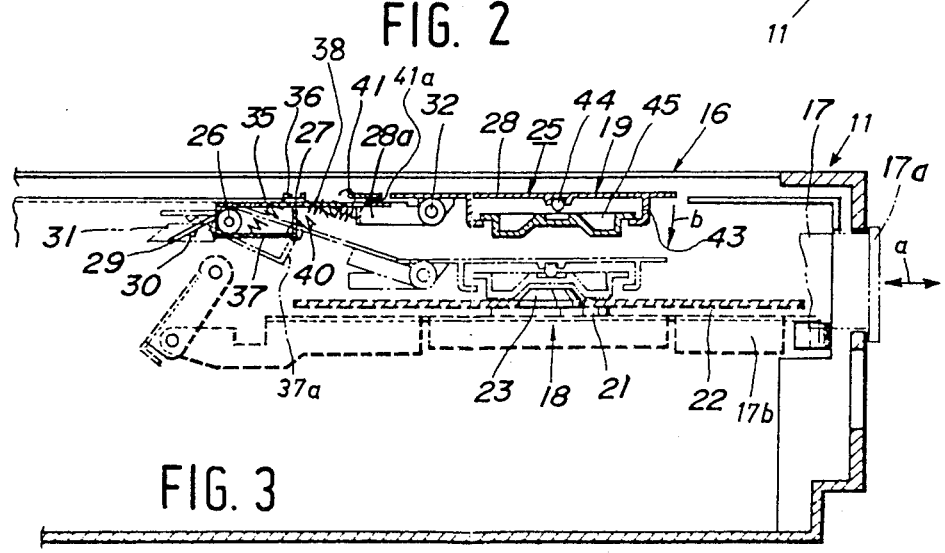
FIG. 3 is a sectional view taken on the lines III—III in FIG. 2, FIG. 4, is a sectional view taken on the lines IV—IV in FIG. 2, at a still larger scale, showing the pressure portion and the pressure member in the operating position.

Inside the mechanical section 16 a loading device 17 is situated, which as shown in FIGS. 2 and 3 can be slid in and out rectilinearly as indicated by the bidirectional arrow a. A transfer device 17b is arranged in the loading device 17. This device can be lowered in a manner not shown towards a turntable 21 of a playback unit 18 of the player, after complete insertion of the disc 22. A disc 22 on the transfer device 17b is then slid onto a centering cone 23 which projects from the turntable 21. The disc is centered and is subsequently lowered onto the turntable. The transfer device 17b now moves downwardly to a position below the upper side of the turntable 21 in the manner shown in FIG. 3. After the loading device 17 has been slid inwards the disc 22 thus lies on the turntable, after which a motor, not shown, in the playback unit 18 causes the turntable 21 to rotate.

For pressing the disc 22 onto the turntable 21 a pressure mechanism 19 is arranged above the turntable. The mechanism 19 comprises a pressure lever 26 which is pivotable about a lever spindle 26. As is shown in FIG. 2 the pivotal spindle 26 is connected to the upper part of the frame of the player approximately in the center of the mechanical unit 16.

The pressure lever 25 comprises an arm portion 27 and a pressure portion 28. The arm portion 27 can be pivoted downwards about the spindle 26 from the horizontal position, represented by solid lines, relative to the upper side of the turntable 21. This pivotal movement is controlled by means of an actuating lever 37 which comprises an actuating portion 29, which is situated to the left of the spindle 26 in FIG. 3, and a stop portion 37a, which is situated to the right of the spindle 26. In an upper position of the actuating lever 37 the actuating portion 29 extends obliquely downwards. A tension spring 40, hereinafter referred to as the first spring, is arranged between the actuating lever 37 and a frame portion 41 and urges lever 37 counterclockwise (as viewed in FIG. 3) into the upper position. The first spring 40 extends from the actuating lever 37 through a recess 39 in the arm portion 27, so that the spring 40 cannot impede the movements of the arm portion 27. As in this position of the lever 37 the upper free end of the stop portion 37a abuts with the lower side of the arm portion 27, the arm portion 27 is urged upwards against a frame portion 41 and also assumes a substantially horizontal position relative to the upper side of the turntable 21. Preferably, a strip 41a of a damping material such as felt is arranged on the underside of the frame portion 41 to preclude mechanical noise when the arm portion 27 is pivoted upwards against the frame portion 41.

The actuating portion 29 of the actuating lever has a projection 30 which, in the position shown in FIG. 3, is situated in the path of movement of a drive member 31 constituted by a projection on the loading device 17. As is shown in FIG. 3, the actuating portion 29 is actuated by the drive member 31 during the last stage of the inward movement of the loading device 17. As a result of this the actuating lever 37 is now pivoted towards the position represented by the broken lines in FIG. 3.

The pressure portion 28 of the pressure lever is connected to the right-hand end of the arm portion 27 by a hinge or pivot 32, so that the pressure portion 28 can adapt its position relative to the arm portion 27 and the pressure portion 28 can assume a substantially horizontal position relative to the upper side of the turntable 21 in both the upper and lower positions. The pivot 32 extends between the limbs 27a, 27b of the arm portion 27, to provide adequate freedom of movement for the pressure portion 28 during pivoting.

The pressure portion 28 has a projection 28a on the opposite side of the pivot 32 between the limbs 27a and 27b. This projection is connected to a tension spring 38 whose other end is attached to a hook 36 on the arm portion 27. An opening 34 is formed in the arm portion 27 through which the spring 38, hereinafter referred to as the third spring, extends so that the third spring urges the pressure portion 28 clockwise as viewed in FIG. 3 with respect to the arm portion 27 about the pivot 32.

A tension spring 35, hereinafter referred to as the second spring, extends through an opening 33 in the arm portion 27, which spring is also secured at one end to the hook 36, and at the other end to the actuating lever 37. The second spring 35 ensures a correct abutment of the stop portion 37a of the actuating lever 37 with the arm portion 27, and the third spring 38 ensures that the projection 28a abuts the frame portion 41 in the position shown by solid lines in FIG. 3, so that the pressure portion 28 also occupies a stable horizontal position relative to the upper side of the turntable 21. Again a piece of damping material 41a between the projection 28a and the underside of the frame portion 41 precludes undesired mechanical noise during the upward pivotal movement of the pressure portion 28.

Figure 4:
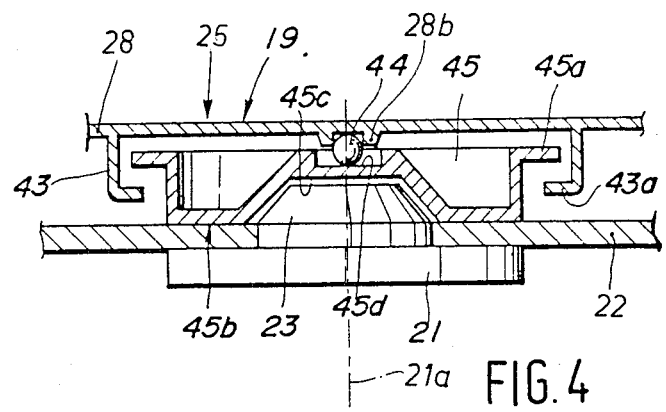

The underside of the pressure portion 28 carries a cylindrical pressure-member holder 43 which, as shown in FIG. 4, carries an annular flange 43a. Further, the holder 43 is open at the underside, An annular element 28b is arranged on the lower surface of the upper wall of the pressure member 28, into which element a ball 44 is urged. In the position, hereinafter referred to as the operating position, and indicated by broken lines in FIG. 3 the ball 44 with the annular element 28b is situated coaxially with respect to the turntable axis 21a. A pressure member 45 is retained in and can rotate freely inside the holder 43. The pressure member 45 comprises an annular flange 45a which ensures that the member 45 cannot drop out of the holder. In the raised position, hereinafter referred to as the inoperative position of the pressure member, the flange 45a of the pressure member rests on the annular flange 43a.

On its underside the pressure member 45 has a pressure surface 45b for cooperation with a disc 22, and in the center of the bottom of the pressure member 45 a cavity 45c is formed with a conical circumferential wall. This cavity is slightly larger than the circumferential dimension of the centering cone 23. Thus, during the movement towards the operating position the pressure member 45 can be centered relative to the turntable axis 21a by the centering cone 23. In the pressure member 45, at the side which faces the cavity 45c, a cavity 45 is formed with a flat bottom wall which extends parallel to the upper side of the turntable 21 in the position shown in FIG. 4, and which is positioned against the ball 44. In this position the ball 44, the pressure-member holder 43 and the pressure member 45 are coaxial with each other. The height of the holder 43 has been selected in such a way that when the pressure member 45 is pressed against a disc 22 by the pressure exerted by the ball 44, a clearance of, in the present example, at least 2 mm is always left between the underside of the flange 43a and the upper side of the disc 22, so that the holder 43 cannot obstruct the rotation of the disc 22.

The disc-record player described above operates as follows. After the disc 22 has been put on the transfer device 17b in the slid-out position of the loading device 17 the device 17 may be slid inwards automatically or manually, the drive member 31 acting against the projection 30 on the actuating portion 29 of the actuating lever 37 at the end of the slide-in movement. When the device moves further inwards during a final stage of the inward movement the actuating lever 37 is pivoted clockwise into the downwardly inclined position indicated by the broken lines in FIG. 3. During this downward pivotal movement the tension spring 40 between the actuating lever 37 and the frame portion 41 is tensioned, the spring 40 tending to pivot back the actuating lever 37, but this pivoting is impossible when the loading device 17 is in the inward position.

The spring 35 between the actuating lever 37 and the arm portion 27 ensures that the stop portion 37a constantly abuts with the underside of the arm portion 27a and the arm portion 27 follows the pivotal movement of the lever 37 about the spindle 26. This pivotal movement of the arm portion 27 results in a downward movement of the pressure portion 28 in the direction indicated by the arrow b towards the operating position represented by the broken lines in FIG. 3. The pressure portion 28 then pivots about the spindle 32 and is maintained in the substantially horizontal position relative to the upper side of the turntable 21, in part as a result of the direction in which the pressure portion 28 is pulled by the spring 38. As already stated, the disc 22 is slid onto the centering cone 23 at the end of the inward movement, is centered and is lowered onto the upper surface of the turntable. Subsequently, the transfer device 17b moves to a position below the upper side of the turntable.

During the inward movement of the loading device 17 the downward movement of the pressure portion 28 has caused the cavity 45c of the pressure member 45 to engage the centering cone 23, the centering cone centering the pressure member relative to the axis of rotation 21a of the turntable 21. Subsequently, the pressure surface 45b comes into contact with the upper side of the disc 22 and the ball 44 engages the upper cavity 45d of the pressure member. At this instant the ball 44 and the pressure member 45 are in a coaxial position relative to the centering cone 23. The ball 44 has reached the upper cavity 45d and acts against the flat bottom wall of the cavity.

Figure 5:
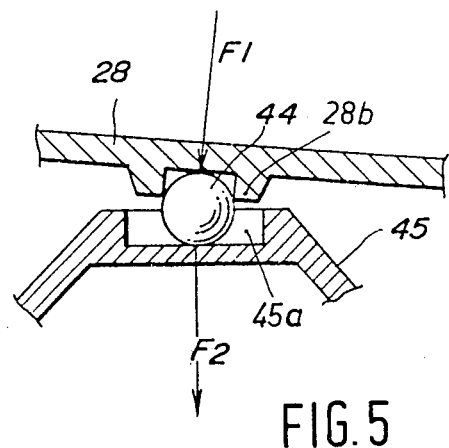
FIG. 5 is a sectional view of the pressure portion and the pressure member, with the interposed ball in the situation in which the pressure portion has begun to act against the pressure member but has not yet reached the final position.

A position as shown in FIG. 5 is possible temporarily, in which position the pressure portion 28, as it is being pivoted downwards towards the operating position, may briefly occupy a slightly inclined position. When the ball 44 acts on the pressure member 45 the pressure portion 28 exerts a force F1 on the ball 44. As it is retained in the ring 28b the ball 44 now exerts a force F2 on the bottom wall of the cavity 45d, which force F2 acts in line with the axis of rotation 21a. Thus, the ball 44 does not exert any lateral forces on the shaft of the turntable 22, so that the shaft, the shaft-bearing and the motor beneath the turntable 21 are not subjected to undesired loads. The ball 44 ensures that the disc 22 is pressed into an accurately horizontal position parallel to the upper side of the turntable 21 with a circumferentially uniform pressure.

Near the end of the inward movement of the loading device 17 the actuating lever 37 is pivoted slightly further in a clockwise direction, but after the pressure portion 28 has reached the operating position and has assumed a substantially horizontal position the arm portion 27 cannot be pivoted any further. As a result of this, the spring 35 is tensioned further and the stop portion 37a comes clear of the underside of the arm portion 27. This enables the actuating lever 37 to be pivoted slightly further by the drive member 31 without the arm portion 27 or other portions of the pressure lever 25 being damaged. This ensures that the pressure lever 25 is always pivoted far enough to exert the required pressure on the disc 22. This extended pivotal movement of the lever 17 also enables tolerances between the loading device 17, in particular the drive member 31, and the actuating lever 37, to be compensated for effectively.

When the loading device 17 is slid out the actuating lever 37 is pivoted counterclockwise, causing the stop portion 37a to abut again with the underside of the arm portion 27. This is effected under the influence of the force exerted on the lever 37 by the spring 40. The mutually coupled system of the lever 37 and the arm portion 27 is subsequently pivoted counterclockwise under the influence of the spring 40 and the spring 35. This, and the presence of the spring 38, cause the pressure portion 28 to be moved upwards, the pressure portion being pivoted about the spindle 32 and remaining in a substantially horizontal position. The pressure exerted on the pressure member 45 by the ball 44 is then discontinued and the pressure on the disc 22 also ceases. As the pressure portion 28 is lifted further the pressure member 45 is fully disengaged from the ball 44 and the flange 45a of the pressure member 45 again bears on the flange 43a of the pressure-member holder 43. At the end of this movement the arm portion 27 and the pressure portion 28 again abut with the frame portion 41, so that these portions occupy their stable horizontal inoperative positions. In this situation the space between the turntable 21 and the underside of pressure member 45 after the transfer device 17b has been raised and the disc has been lifted off the turntable is amply sufficient to allow the loading device 17 to be slid out freely, unimpeded by the pressure member 45 or other parts of the pressure mechanism 19. This position is also advantageous when the loading device 17 is slid inwards. Thus, in spite of the presence of the ball 44 between the pressure portion 28 and the pressure member 45, there is an adequate clearance to allow the movement of the loading device 17. Moreover, the height of the housing 11 can be limited, yielding a disc-record player of compact construction.

Figure 7:
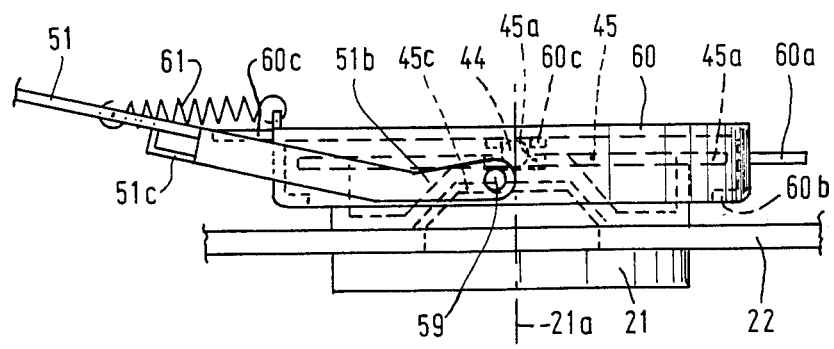
FIG. 7 is a side view of the arm and pressure portions of the pressure lever and the pressure member of the embodiment of FIG. 6 in the operating position.
Figure 6:
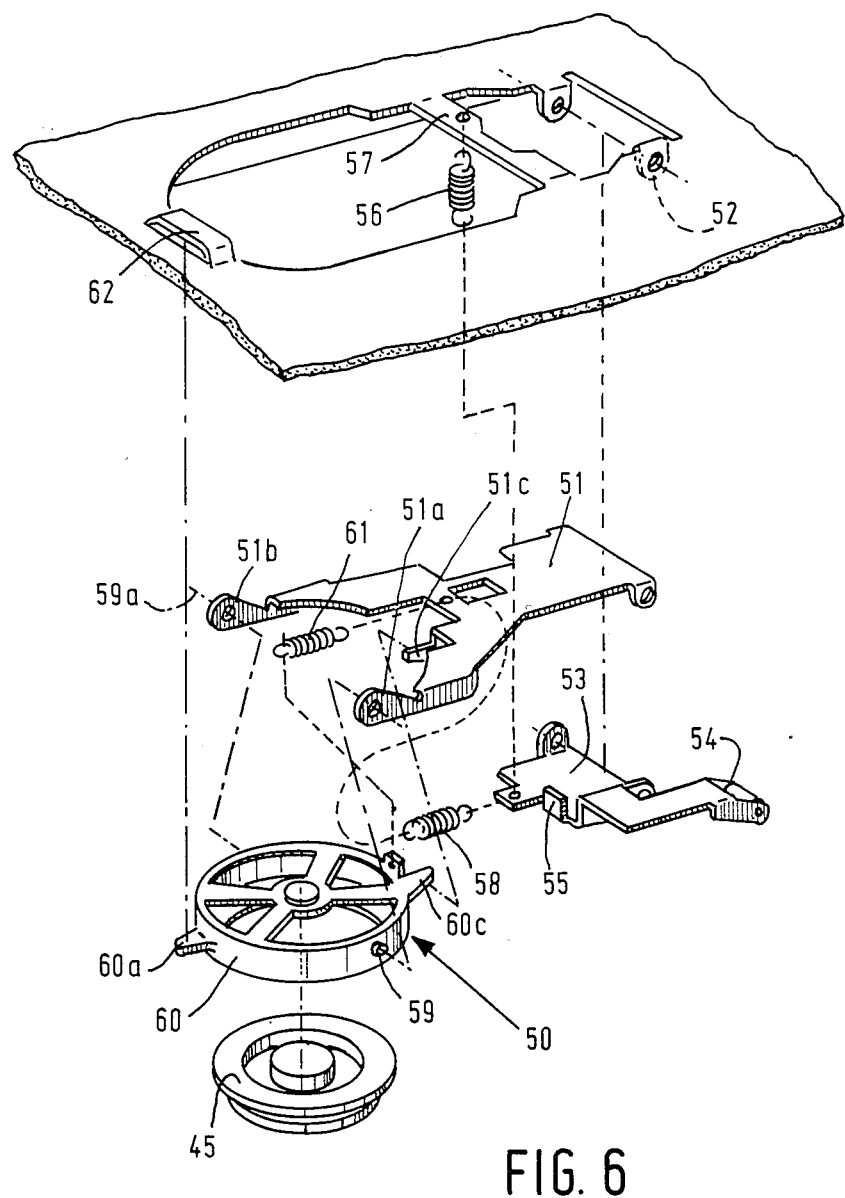
FIG. 6 is an exploded perspective view of the relevant parts of a second embodiment of the invention.

The second embodiment of the invention shown in FIGS. 6 and 7 comprises a pressure mechanism 30 whose operation is largely identical to that of the pressure mechanism 19 in the first embodiment. The pressure mechanism 50 also comprises an arm portion 51 which is pivotable about a pivotal spindle 52 which is connected to the frame of the player, an actuating lever 53 being also pivotable about this spindle. The actuating lever 53 comprises an actuating portion 54 having a downwardly inclined shape and a stop portion 55 which is situated at the other side of the spindle 52. A tension spring 56 is arranged between the actuating lever 53 and a frame portion 57. A tension spring 58 is arranged between the actuating lever 53 and the arm portion 51, which spring causes the arm portion 51 to abut with the stop portion 55. The arm portion 51 comprises two projecting limbs 51a, 52b which near their free ends have openings which receive pins 59 on a pressure portion 60 on the pressure mechanism 50. A tension spring 61 arranged between the pressure portion 60 and the arm portion 51 ensures that in the inoperative position of the pressure member 60 a projection 60a of the pressure portion abuts with a frame portion 62, so that in this situation the pressure portion is in a substantially parallel position to the upper side of the turntable 21.

The pressure member 45 is arranged inside the pressure portion 60 in the same way as in the first embodiment. Again the pressure portion 60 comprises an annular flange 60b which supports the annular flange 45a of the pressure member 45 in the inoperative raised position of the pressure mechanism. The lower surface of the upper wall of the pressure portion 69 comprises an annular portion 60c which retains the ball 44 in a radial direction. In the present embodiment this ball 44 is also coaxial with the axis of rotation 21a of the turntable 21 in the operating position of the pressure member 45. In FIG. 7 the pivotal axis 59a is situated slightly to the left of the center of the pressure portion 60 and the pressure member 45. This means that the pressure portion tends to pivot slightly clockwise about the axis 59a, but this pivoting is prevented by the spring 61. Further, the arm portion 51 comprises a projection 51c which can abut with a projection 60c on the pressure portion 60 when the pressure mechanism 50 moves upwards. This ensures that the pressure portion with the pressure member always assumes a substantially horizontal position relative to the upper side of the turntable 21.

The operation of the second embodiment shown in FIGS. 6 and 7 resembles that of the first embodiment. The present embodiment has the advantage that the pressure portion 60 which is pivotally connected to the arm portion 51 can be of a lightweight and compact construction and can be manufactured from a plastic. In the inoperative raised position of the pressure member this enables a comparatively large distance to be obtained between the underside of the pressure member 45 and the turntable 21. Thus, in the present embodiment the loading device 17 can also be slid in and out without being obstructed by the pressure member.

It is to be noted that the tension spring 61 in the second embodiment may be dispensed with because the light construction of the pressure portion 60 and the pressure member 45 enable a correct balancing to be obtained in an easy manner. In this respect it may be advantageous to arrange another projection in addition to the projection 60c, on the pressure portion 60. This additional projection can act against the underside of the arm portion 51 to limit the pivotal movement of the pressure portion 60 about the axis 59a in two directions. The distance between the additional projection and the projection 60c should then be such that when the arm portion 51 is pivoted upwards the pressure portion 60 can pivot adequately to adapt its position relative to the arm portion 51.

What is claimed is:

1. A disc-record player comprising a frame, a turntable having a playing side and mounted for rotation in said frame, a pressure lever pivotally connected to the frame, a pressure member carried and movable by the pressure lever from an inoperative position towards the turntable into an operating position, and a ball arranged between the pressure lever and the pressure member; in the operating position the ball and the pressure member being substantially coaxial with the turntable, the pressure lever exerting pressure on the pressure member through the ball, and the pressure member urging a disc, which has been placed into the player, against the playing side of the turntable, characterized in that the pressure lever is articulated, and comprises an arm portion pivotally connected to the frame about a first pivot axis, and a pressure portion pivotally connected to the arm portion about a second pivot axis parallel to said first pivot axis, said pressure member is carried by said pressure portion, and the player includes means for causing the pressure member to lie substantially parallel to the turntable playing side both in the inoperative and in the operating positions.

2. A player as claimed in claim 1, characterized in that the pressure portion comprises an annular part arranged on the side of the pressure portion facing the turntable for holding the ball against displacement in directions transverse the axis of the turntable, at least in the operating position of the pressure member said annular part being coaxial with the turntable.

3. A player as claimed in claim 1, characterized by comprising:

an actuating lever pivotally connected to said frame about said first pivotal axis, a first spring arranged between the frame and the actuating lever to urge the actuating lever in a axial direction away from the turntable, and a second spring arranged between said actuating lever and said arm portion to urge the arm portion and the actuating lever into abutment with each other so that they are pivoted together when the pressure member moves from the inoperative position to the operating position, the actuating lever being pivotable further against the force of the second spring when the pressure member has reached the operating position, thereby permitting the actuating lever to become disengaged from the arm portion.

4. A disc-record player comprising a frame, a turntable having a playing side and mounted for rotation in said frame, a pressure lever pivotally connected to the frame, a pressure member carried and movable by the pressure lever from an inoperative position towards the turntable into an operating position, and a ball arranged between the pressure lever and the pressure member; in the operating position the ball and the pressure member being substantially coaxial with the turntable, the pressure lever exerting pressure on the pressure member through the ball, and the pressure member urging a disc, which has been placed into the player, against the player side of the turntable, characterized in that the pressure lever is articulated, and comprises an arm portion pivotally connected to the frame about a first pivot axis, and a pressure portion pivotally connected to the arm portion about a second pivot axis parallel to said first pivot axis, said pressure member is carried by said pressure portion, and the player includes:

means for causing the pressure member to lie substantially parallel to the turntable playing side both in the inoperative and in the operating positions, an actuating lever pivotally connected to said frame about said first pivotal axis, and comprising an actuating portion and a stop portion, the stop portion abutting the arm portion during the common pivotal movement of the actuating lever and the arm portion, a drive member, and means for controlling the pivotal movement of the actuating lever responsive to movement of said drive member, a first spring arranged between the frame and the actuating lever to urge the actuating lever in an axial direction away from the turntable, and a second spring arranged between said actuating lever and said arm portion to urge the arm portion and the actuating lever into abutment with each other so that they are pivoted together when the pressure member moves from the inoperative position to the operating position, the actuating lever being pivotable further against the force of the second spring when the pressure member has reached the operating position, thereby permitting the actuating lever to become disengaged from the arm portion.

5. A player as claimed in claim 4, characterized by comprising a loading device for transferring a disc from outside the player towards the turntable, said drive means forming part of said loading device, and said actuating portion of the actuating lever being disposed in the path of movement of the drive member, under the influence of the first spring, during the inward movement of the loading device; and being actuated and subsequently pivotted by the drive member during a final stage of the inward movement.

6. A player as claimed in claim 11, characterized in that the turnable axis is vertical, with the playing side upward, and the actuating portion and the stop portion of the actuating lever are disposed to opposite sides of said first pivot axis, in the operating position of the pressure member the actuating portion being inclined downwardly and the stop portion extending upwardly relative to the remainder of the actuating lever.

7. A player as claimed in any one of claims 3 to 6, characterized by comprising a third spring arranged between the pressure portion and the arm portion to urge the arm portion toward the turntable, and in that the frame comprises a portion against which the pressure portion abuts in the inoperative position, arranged such that in the inoperative position the pressure portion lies substantially parallel to the playing side of the turntable.

8. A player as claimed in claim 7, characterized in that the pressure portion comprises an annular part arranged on the side of the pressure portion facing the turntable for holding the ball against displacement in directions transverse the axis of the turntable, at least in the operating position of the pressure member said annular part being coaxial with the turntable.

* * * * *